(12) United States Patent
Ries

(10) Patent No.: US 11,220,332 B2
(45) Date of Patent: Jan. 11, 2022

(54) ROTOR WITH PITCH CONTROL APPARATUS

(71) Applicant: AIRBUS HELICOPTERS DEUTSCHLAND GMBH, Donauworth (DE)

(72) Inventor: Tobias Ries, Nordendorf (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 233 days.

(21) Appl. No.: 16/688,261

(22) Filed: Nov. 19, 2019

(65) Prior Publication Data

US 2021/0147073 A1 May 20, 2021

(51) Int. Cl.
  *B64C 27/78* (2006.01)
  *B64C 27/82* (2006.01)
  *B64C 27/57* (2006.01)

(52) U.S. Cl.
  CPC .............. *B64C 27/57* (2013.01); *B64C 27/78* (2013.01); *B64C 27/82* (2013.01); *B64C 2027/8254* (2013.01)

(58) Field of Classification Search
  CPC ......... B64C 11/44; B64C 27/78; B64C 27/82; B64C 27/8209; B64C 27/8254
  See application file for complete search history.

(56) References Cited

U.S. PATENT DOCUMENTS

| 4,648,345 A | 3/1987 | Wham et al. |
| 5,967,749 A | 10/1999 | Eaves et al. |
| 9,758,245 B2 * | 9/2017 | Ries ........................ B64C 27/12 |
| 2004/0198136 A1 | 10/2004 | Vogel |
| 2010/0123039 A1 | 5/2010 | Buhl et al. |
| 2017/0174355 A1 | 6/2017 | Waltner et al. |
| 2020/0130824 A1 | 4/2020 | Willinger |

FOREIGN PATENT DOCUMENTS

| DE | 102008057715 A1 | 5/2010 |
| EP | 2821344 B1 | 1/2015 |
| EP | 2 821 344 B1 | 10/2015 |
| FR | 2851932 A | 9/2004 |
| GB | 2388095 A | 11/2003 |
| WO | 2002070094 A2 | 9/2002 |
| WO | 2002070094 A3 | 11/2002 |
| WO | 2019/012191 A1 | 1/2019 |

OTHER PUBLICATIONS

European Search Report for European Application No. EP 18400024. 8, Completed by the European Patent Office, dated Jan. 28, 2019, 10 pages.

* cited by examiner

*Primary Examiner* — Richard A Edgar
(74) *Attorney, Agent, or Firm* — Brooks Kushman P.C.

(57) ABSTRACT

A rotor comprises at least two rotor blades, and each rotor blade of the at least two rotor blades rotates around a rotor axis and performs pitching around a pitch axis. The rotor axis and the pitch axis intersect in a rotor center. The rotor is characterized in that each rotor blade comprises at least one permanent magnet having a first spherical magnet surface. Each rotor blade further comprises a pitch control apparatus for controlling the pitching of the at least two rotor blades. The pitch control apparatus comprises electrically controlled magnets having a second spherical magnet surface.

17 Claims, 8 Drawing Sheets

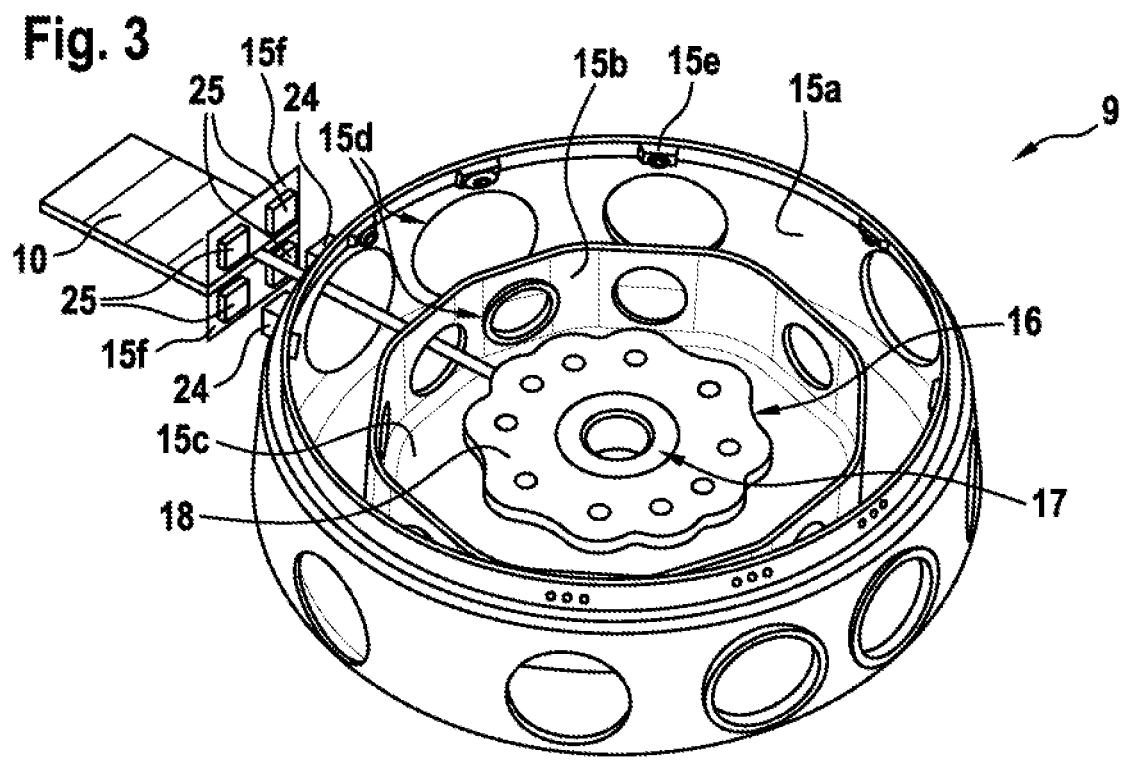

A-A

A-A

ROTOR WITH PITCH CONTROL APPARATUS

BACKGROUND OF THE INVENTION

(1) Field of the Invention

The invention is related to a rotor, and, more particularly, to a pitch control apparatus for controlling pitching of the rotor blades of a rotor.

(2) Description of Related Art

Generally, rotating thrust systems with blades are controlled by a variable pitch control system for eliminating problems caused by high torque moments and low thrust change rates. Exemplarily, a main rotor of a helicopter allows vertical starting and landing of the helicopter without need for horizontal propulsion. By turning the main rotor of the helicopter, a torque opposite to the direction of rotation is generated and performs a rotational movement. In order to control movements of the aircraft, it is necessary to compensate the rotational movement generated by the torque of the main rotor.

For this purpose, a separate tail rotor is often used to generate a thrust against the torque. Such a tail rotor usually has a plurality of rotor blades that are integrated in a housing of a tail boom to reduce the risk of injury. In recent years, at least portions of the tail rotor are driven by electric motors.

Documents US 2017/0174355 A1, DE 10 2008 057 715 A1, and US 2010/0123039 A1 describe a redundant electric drive for a tail rotor, in which a plurality of drive units is arranged on the rotor axis and can be controlled separately. If one of the drive units fails on the rotor axis, then at least the remaining ones continue driving further. However, the drive units are installed close to each other in such a way that all drive units would be affected in case of a serious accident on the rotor axis.

The thrust produced by the rotor blades of a tail rotor can be controlled in two different ways: either by controlling the rotation speed of the rotor blades around the rotor axis, or by controlling an aerodynamic lift coefficient of the rotor blades. The aerodynamic lift coefficient is usually controlled by adjusting an underlying pitch angle of the rotor blades.

Recently, several pitch control apparatuses have emerged that electrically control the pitch angle adjustment of tail rotor blades. In such a pitch control apparatus, electromagnetic poles are arranged on the circumference of the tail rotor. These electromagnetic poles work together with magnets on the rotor blades to adjust the pitch angle of the rotor blades.

Document EP 2 821 344 B1 describes a rotor drive system, particularly a rotor drive system of a tail rotor of a helicopter, comprising a stator and a rotor. In that system, the rotor is described as being mounted to the stator with a rotatable central carrier and rotor blades radially attached to the rotatable central carrier. Each rotor blade is pivotable about its respective radial central axis in order to achieve variation of blade pitch. Along at least one blade radius, at least one permanent magnet is provided on each rotor blade and a plurality of electromagnets on the stator are provided coaxially on at least one stator radius close enough to said at least one blade radius to allow inductive interaction between the plurality of electromagnets and the at least one permanent magnet on each rotor blade. The permanent magnets are described as being fixed to the rotor blades offset from the radial central axis in a direction perpendicular to the rotation plane in order to achieve individual pitch control of the rotor blades by individual control of the electromagnets connected to electric supply means.

However, one magnet on the blade tips is often not enough to generate the required torque for changing the pitch angle of the rotor blade. Moreover, the total number of magnets in the motor is usually too low to provide the required torque and power to enable a pitch angle change. Therefore, more magnet pairs than the number of blades are usually required to solve the presented problems and to ensure efficient functionality of the rotor system.

Nevertheless, it is not simply possible to add more magnets in circumferential direction on the tail rotors, because the use of multiple magnets per blade in combination with cylindrical surfaces and pitch change may geometrically lead to the need for big gaps between the magnet surfaces. In that case, a change of the pitch angle of a rotor blade could lead to a strong weakening of the magnetic field interaction between the magnets connected to the blade and the electric magnets in the non-rotating frame on the hub. In other words, the geometric distance between the additional magnets and the electric magnets would be so large that the pitch control apparatus would become unreliable and/or inefficient.

In addition, the magnetic field between the electromagnets and the rotor magnet elements would not be constant during pitching and rotating.

BRIEF SUMMARY OF THE INVENTION

Based on the limitations and drawbacks of the prior art, an objective is to provide a rotor with a pitch control apparatus in which the arrangement of the permanent magnets on the rotor blades and the electric magnets ensures the efficient adjustment of the pitch angle of the rotor blades based on an essentially constant magnetic field. More specifically, the objective is to provide a rotor with at least two rotor blades and an electrically operated pitch control apparatus which exhibits at least one individual magnet pair per blade having a configuration that forms a gap between the rotor and a stator that is constant during pitch angle change. The documents U.S. Pat. No. 7,134,840, FR2851932, U.S. Pat. Nos. 5,967,749, 4,649,345 and GB2388095 are known.

This objective is solved by a rotor comprising the features of claim 1.

More specifically, a rotor comprises at least two rotor blades and a pitch control apparatus for controlling the pitching of the at least two rotor blades. Each rotor blade of the at least two rotor blades rotates around a rotor axis and performs pitching around a pitch axis. The rotor axis and the patch axis intersect in a rotor center. Each rotor blade comprises at least one permanent magnet having a first spherical magnet surface. The pitch control apparatus comprises electrically controlled magnets having a second spherical magnet surface.

According to one aspect, a first distance from the rotor axis and a second distance from the pitch axis define a first predetermined radius. A third distance from the rotor axis and a fourth distance from the pitch axis define a second predetermined radius. The first spherical magnet surface is at the first predetermined radius from the rotor center, and the second spherical magnet surface is at the second predetermined radius from the rotor center.

According to one aspect, the second and fourth distances are selected based on a predetermined pitch torque requirement for each rotor blade of the at least two rotor blades during pitching.

According to one aspect, the first and third distances are selected based on a predetermined drive torque requirement for driving the rotor.

According to one aspect, the first predetermined radius is greater than the second predetermined radius.

According to one aspect, the second predetermined radius is greater than the first predetermined radius.

According to one aspect, the at least one permanent magnet and the electrically controlled magnets are arranged opposing each other and form a constant gap between the first and second spherical magnet surfaces during pitching defined by an absolute value of a difference between the first and second predetermined radii.

According to one aspect, the constant gap between the first and second spherical magnet surfaces ensures an overlapping magnetic field between the at least one permanent magnet and the electrically controlled magnets.

According to one aspect, the electrically controlled magnets control the pitching of each rotor blade of the at least two rotor blades individually.

According to one aspect, the at least two rotor blades rotate in a rotor plane and each rotor blade of the at least two rotor blades comprises at least one first permanent magnet of the at least one permanent magnet on a first side of the rotor plane and at least one second permanent magnet, of the at least one permanent magnet on a second side of the rotor plane that is opposite to the first side of the rotor plane.

According to one aspect, the at least one first permanent magnet and the at least one second permanent magnet are installed on a magnet support around the rotor center on each side of the at least two rotor blades and move with the at least two rotor blades around the pitch axis during pitching.

According to one aspect, the at least one permanent magnet of each rotor blade overlaps with at least a portion of the electrically controlled magnets in an overlap area, wherein the overlap area is constant during pitching of each rotor blade of the at least two rotor blades.

According to one aspect, the at least one permanent magnet has an hourglass cross-section shape. The hourglass cross-section shape of the at least one permanent magnet has a middle section width and an outer section width that is greater than the middle section width. The middle section width is based on the width of the electrically controlled magnets and the outer section width is based on a maximum movement of the at least one permanent magnet during pitching.

According to one aspect, the at least one permanent magnet has a trapezoidal cross-section shape wherein the trapezoidal cross-section shape of the at least one permanent magnet has a first outer section width and a second outer section width that is greater than the first outer section width.

According to one aspect, the rotor further comprises a rotor hub having an outer circular wall and a central blade mount that receives the at least two rotor blades, wherein the electrically controlled magnets are arranged on the outer circular wall.

According to one aspect, the outer circular wall provides a static, non-rotating magnet support.

According to an embodiment, a rotorcraft may include at least one rotor as described above.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

FIG. 3 is a diagram of an illustrative rotor hub and a central blade mount with a pitch control apparatus having electrically controlled magnets installed on a rotating surface in accordance with some embodiments.

DETAILED DESCRIPTION OF THE INVENTION

Exemplary embodiments may be included in any rotor or propeller such as a rotor or propeller of a transportation vehicle, if desired.

Figure 1:
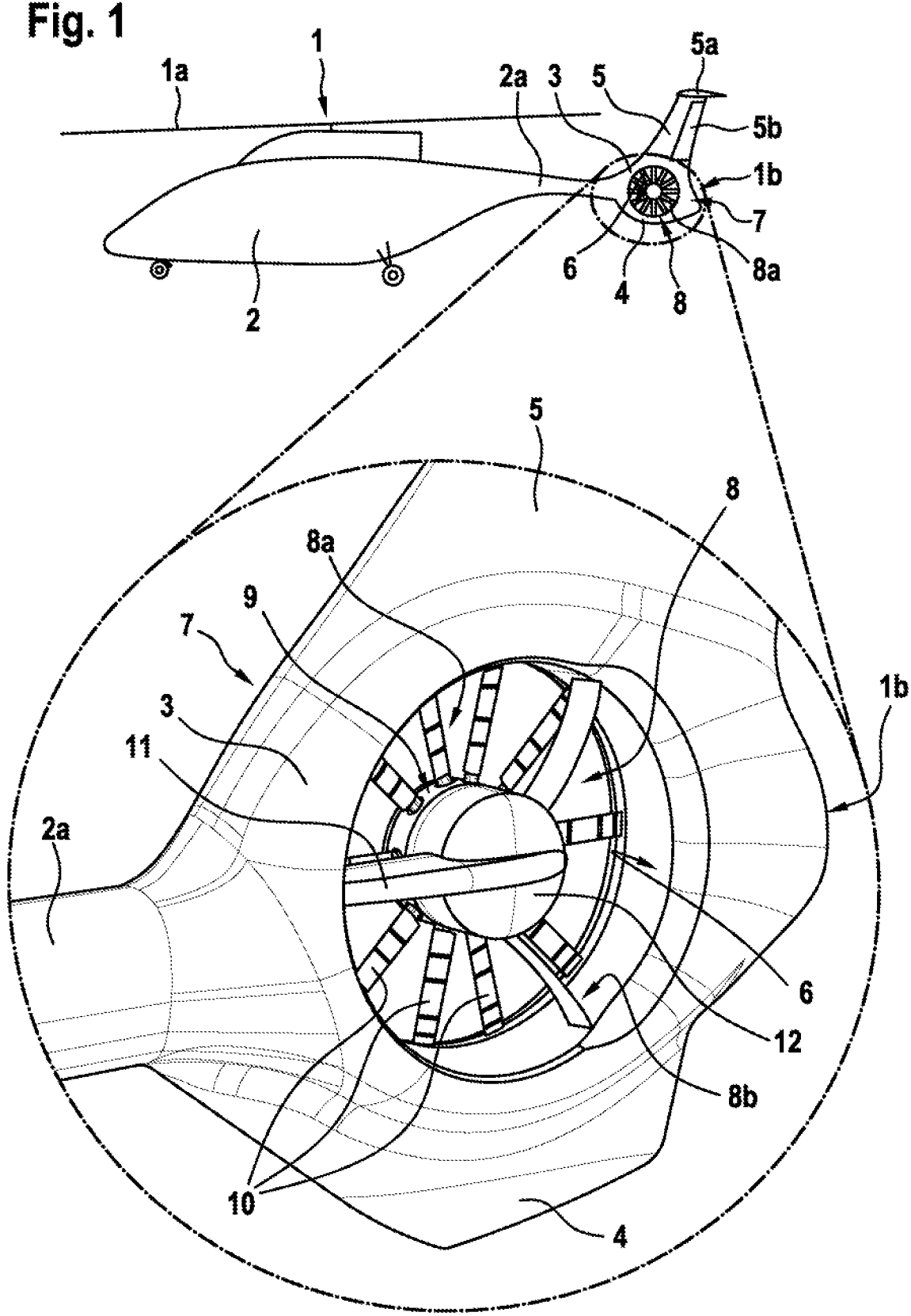
FIG. 1 is a diagram of an illustrative rotorcraft with a ducted tail rotor, including an enlarged perspective view of the ducted tail rotor in accordance with some embodiments.

FIG. 1 shows an example of a transportation vehicle. A transportation vehicle may be an airplane, a multicopter, a helicopter, or any other rotary wing transportation vehicle. As shown in FIG. 1, the transportation vehicle may be a rotorcraft 1 that is exemplarily illustrated as a helicopter. Thus, for purposes of simplicity and clarity, the rotorcraft 1 is hereinafter referred to as the "helicopter" 1. As shown, helicopter 1 may include a fuselage 2 that includes a tail boom 2a.

Helicopter 1 includes at least one main rotor 1a that is configured to provide lift and forward thrust during operation, and at least one counter-torque device 8 that is configured to provide counter-torque during operation, i.e. to counter the torque created by rotation of the at least one main rotor 1a for purposes of balancing helicopter 1 in terms of yaw.

At least one counter-torque device 8 is illustratively provided at aft section 1b of tail boom 2a, which may include at least one duct-type tail portion 7. By way of example, aft section 1b further includes bumper 4 and fin 5 in the form of a T-tail having tail wing 5a and rudder 5b. Tail wing 5a may be adjustable in its inclination and can overtake the functioning of a horizontal stabilizer. Alternatively, or in addition, helicopter 1 is provided with a suitable horizontal stabilizer. Rudder 5b may be adapted to provide for enhanced directional control of helicopter 1 and can be deflected to large angles to reduce a given lateral drag of fin 5 in sideward flight.

Duct-type tail portion 7 is provided with a shroud 3 that defines at least one transverse duct 6 having an at least approximate circular or annular cross-section, and at least one counter-torque rotor 8a that is arranged rotatably. At least one transverse duct 6 illustratively extends through the shroud 3. Furthermore, at least one counter-torque stator 8b is fixedly arranged inside the at least one transverse duct 6 in order to support at least one counter-torque rotor 8a rotatably. Counter-torque rotor 8a, counter-torque stator 8b and shroud 3, i.e. transverse duct 6, illustratively define at least one counter-torque device 8 of helicopter 1, which is embodied in the form of a ducted tail rotor and, more specifically, in the form of a Fenestron® tail rotor. Accordingly, for simplicity and clarity, counter-torque device 8 and, in particular, counter-torque rotor 8a is hereinafter also referred to as the "ducted tail rotor".

At least one ducted tail rotor 8a illustratively includes rotor hub 9 having a rotor axis, and at least two rotor blades 10 that are attached to rotor hub 9 and rotate around the rotor axis in operation.

In some embodiments, the at least one ducted tail rotor 8a may include one or more magnet supports such as magnet supports 15f of FIG. 4 on each rotor blade 10. The one or more magnet supports on each rotor blade may be equipped with permanent magnets that have a spherical magnet surface.

If desired, a static, non-rotating magnet support such as non-rotating magnet support 15g of FIG. 4 may be arranged on each side of the rotor blades 10 in a plane that is perpendicular to the rotor axis. For example, a static, non-rotating magnet support may be attached to a non-rotatable part of the at least one ducted tail rotor 8a, e.g. to counter-torque stator 8b or to stator vanes such as stator vanes 13 of FIG. 2. The static, non-rotating magnet support may be equipped with electrically controlled magnets that have a spherical magnet surface.

Figure 9:
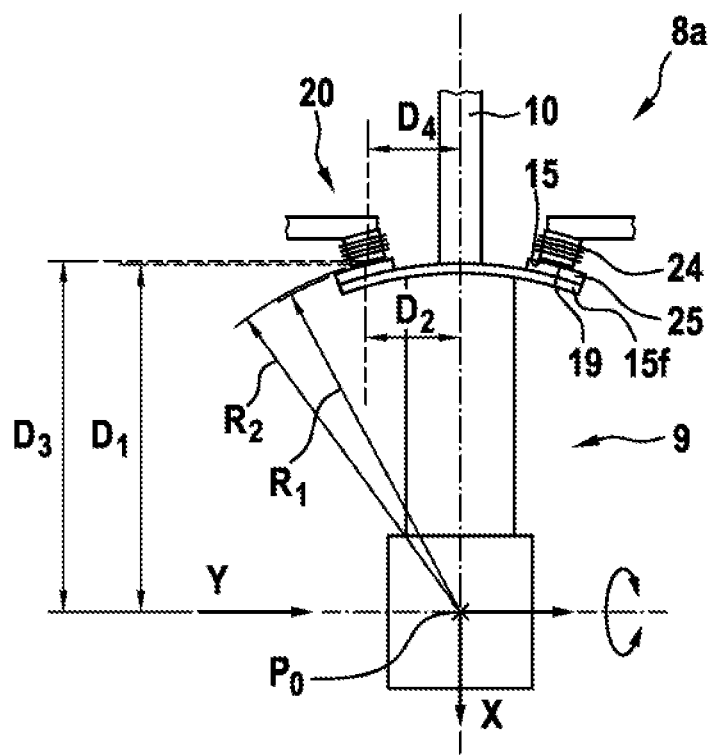
FIG. 9 is a diagram of an illustrative sectional view of a rotor with a pitch control apparatus in accordance with some embodiments.

The spherical magnet surfaces of the permanent magnets and the electrically controlled magnets may have the same center point (e.g., as shown in FIG. 9) and may be arranged close enough to each other to allow inductive interaction between the electrically controlled magnets and the permanent magnets. Thereby, the electrically controlled magnets may accelerate or decelerate the rotational movement of rotor blades 10 around the rotor axis and/or adjust the pitch angle of rotor blades 10 (e.g., by pitching around a pitch axis such as pitch axis X of FIG. 7).

An electromotor, a piston engine, a gas turbine, any combination thereof, or any other torque generating device may drive tail rotor 8a. In some embodiments, an electromotor may drive tail rotor 8a, while the inductive interaction between the electrically controlled magnets and the permanent magnets adjust the pitch angle of the rotor blades as described in the previous paragraph. The electromotor may be located inside a fairing and accelerate and decelerate the at least two rotor blades 10 using a drive shaft such as drive shaft 14 of FIG. 2.

As shown, at least one counter-torque stator 8b illustratively includes drive shaft fairing 11 that is fixedly arranged inside at least one transverse duct 6 and connects gearbox fairing 12 to shroud 3. Drive shaft fairing 11 may be adapted to receive a power transmission shaft of at least one ducted tail rotor 8a. Gearbox fairing 12 is further connected to shroud 3 by means of associated stator vanes (13 in FIG. 2). If desired, gearbox fairing 12 is adapted to receive a rotor drive transmission of at least one ducted tail rotor 8a and can further be adapted to receive pitch variation mechanisms for at least two rotor blades 10. If desired, the inductive interaction between the electrically controlled magnets and the permanent magnets may adjust the pitch angle of the rotor blades as described above.

In some embodiments, the at least one ducted tail rotor 8a may lack a static, non-rotating magnet support, and a rotating magnet support such as rotating outer circular wall 15a of FIG. 3 instead of a static, non-rotating magnet support may be equipped with electrically controlled magnets. The electrically controlled magnets have an appropriately formed spherical magnet surface. If desired, the permanent magnets may have a spherical, or any other appropriately formed magnet surface.

In some embodiments, the surface shape of the permanent magnets may mirror the surface shape of the electrically controlled magnets. For example, the electrically controlled magnets and the permanent magnets both have a spherical magnet surface. As another example, one of the electrically controlled magnets or the permanent magnets may have a convex spherical surface, while the other one of the electrically controlled magnets or the permanent magnets may have a concave spherical surface and vice versa.

However, for the remainder of this description and in an effort to simplify discussion, it is considered that the electrically controlled magnets and the permanent magnets have spherical magnet surfaces. Nevertheless, electrically controlled magnets and permanent magnets with spherical surfaces are considered to be part of the invention.

The spherical magnet surfaces of the permanent magnets on the one or more magnet supports of each rotor blade and the electrically controlled magnets may have the same center point (e.g., as shown in FIG. 9) and may be arranged close enough to each other to allow inductive interaction between the electrically controlled magnets and the permanent magnets. Since the rotating magnet support may rotate with rotor blades 10, the rotating magnet support may be equipped with electrically controlled magnets only at locations that are opposite permanent magnets. Thereby, the electrically controlled magnets may adjust the pitch angle of rotor blades 10 (e.g., by pitching around a pitch axis such as pitch axis X of FIG. 7).

Figure 2:
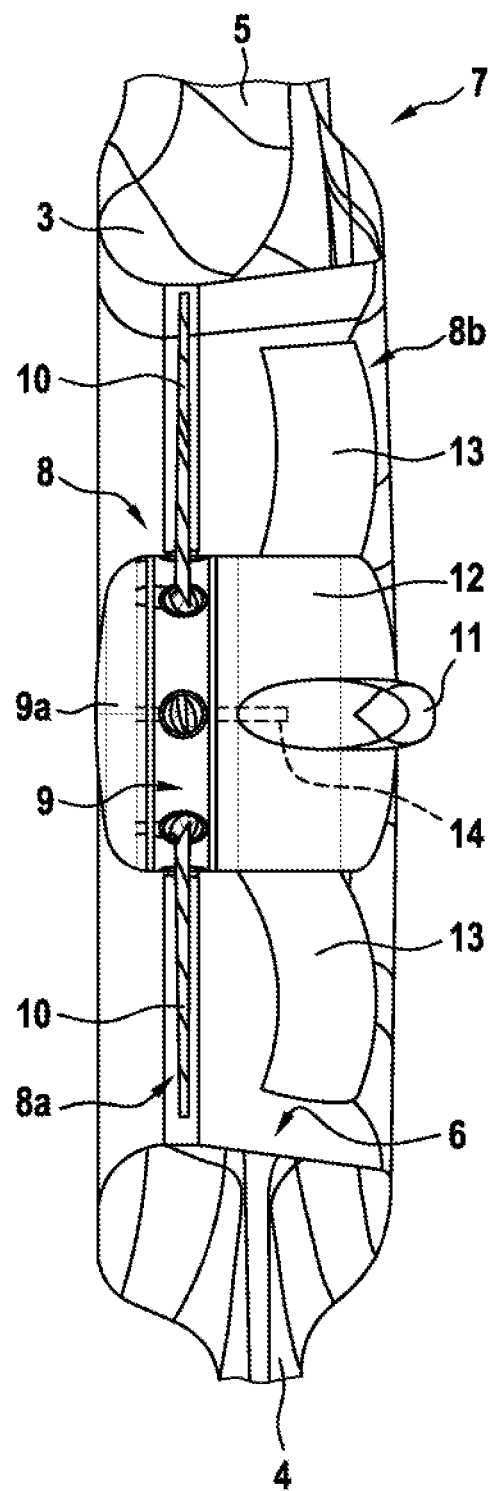
FIG. 2 is a diagram of an illustrative ducted tail rotor with a rotor hub in accordance with some embodiments.

FIG. 2 illustratively shows duct-type tail portion 7 with at least one ducted tail rotor 8a and at least one counter-torque stator 8b, which are arranged in at least one transverse duct 6 of shroud 3. At least one ducted tail rotor 8a may be arranged in close proximity to at least one counter-torque stator 8b and, more specifically, upstream to at least one counter-torque stator 8b with respect to an air flow generated by ducted tail rotor 8a in operation.

At least one ducted tail rotor 8a includes at least two rotor blades 10 and rotor hub 9, which is illustratively covered by hub cover 9a. At least one counter-torque stator 8b includes drive shaft fairing 11 that is fixedly arranged inside at least one transverse duct 6 and connects gearbox fairing 12 to shroud 3. Gearbox fairing 12 is connected to shroud 3 by means of associated stator vanes 13.

According to one aspect, ducted tail rotor 8a is driven in operation by means of associated tail rotor drive shaft 14, which may drivingly couple rotor hub 9 of ducted tail rotor 8a to associated tail gearbox, e.g., via a rotor drive transmission that is accommodated in gearbox fairing 12, as described above in FIG. 1. Rotor hub 9 may be adapted for supporting at least two rotor blades 10, which are, thus, drivable by means of associated tail rotor drive shaft 14.

In some embodiments, electrically controlled magnets arranged on a static non-rotating surface may inductively interact with permanent magnets on magnet supports on each of the at least two rotor blades 10 to drive the at least two rotor blades 10.

In some embodiments, electrically controlled magnets arranged on a static non-rotating surface may inductively interact with permanent magnets on magnet supports on each of the at least two rotor blades 10 to adjust the pitch angle of the respective rotor blade. If desired, the tail gearbox may drive the tail rotor 8a through tail rotor drive shaft 14, and electrically controlled magnets may be used as power generators.

In some embodiments, an electrical motor instead of the tail gearbox may drive tail rotor drive shaft 14.

FIG. 3 illustratively shows rotor hub 9, that is adapted for supporting at least two rotor blades 10, and a central blade mount with a pitch control apparatus having electrically controlled magnets installed on a rotating surface. Each rotor blade 10 of the at least two rotor blades 10 having at least one permanent magnet 25 are drivable by means of a tail rotor drive shaft such as tail rotor drive shaft 14 of FIG. 2, e.g. using an electromotor.

According to one aspect, rotor hub 9 includes rotating outer wall 15a, inner wall 15b, and bottom wall 15c. Rotating outer wall 15a and/or inner wall 15b may be ring-shaped. In some embodiments, rotating outer wall 15a may exhibit a circular profile, respectively, a circular cross-section. If desired, inner wall 15b may exhibit a polygonal profile, respectively, a polygonal cross-section. Bottom wall 15c may connect rotating outer wall 15a to inner wall 15b. If desired, rotating outer wall 15a and/or inner wall 15b may be integrally formed in one piece with bottom wall 15c.

According to some embodiments, bottom wall 15c may be made of fiber reinforced polymers and adapted for being attached to at least two rotor blades 10. Rotating outer wall 15a and/or inner wall 15b and/or entire rotor hub 9 may be made of fiber reinforced polymers, if desired.

In some embodiments, rotating outer wall 15a and/or inner wall 15b and/or entire rotor hub 9 may be made using one or more other fiber reinforced polymers, such as, e.g., glass and/or aramid fiber reinforced polymers.

Rotating outer wall 15a and inner wall 15b may be coaxially arranged and provided with a predetermined number of coaxially aligned, round apertures. By way of example and for simplicity and clarity of the drawings, only two coaxially aligned, round apertures are labelled with the reference number 15d.

Rotating outer wall 15a may further be provided with a plurality of hub cover attachments 15e. Hub cover attachments 15e may be adapted to allow a secure and reliable attachment of hub cover 9a of FIG. 2. Thus, hub cover attachments 15e can be implemented by any means that allow implementation of such a secure and reliable attachment.

According to one aspect, rotor hub 9 is provided with central blade mount 16 that is adapted for being attached to at least two rotor blades 10. Central blade mount 16 may be mounted to a reinforced central portion of bottom wall 15c.

Central blade mount 16 may be provided with central component 17 which is adapted for being drivingly coupled to tail rotor drive shaft 14 of FIG. 2.

In some embodiments, central blade mount 16 may include central flange 18. Central flange 18 may be spaced apart from bottom wall 15c, if desired. Each rotor blade 10 may be attached to central flange 18. According to one aspect, each rotor blade 10 may include at least one permanent magnet 25 arranged on magnet support 15f.

In some embodiments, at least two rotor blades 10 rotating in a rotor plane may each include at least one permanent magnet 25 attached to magnet support 15f on the first side of the rotor plane and/or at least one permanent magnet 25 attached to magnet support 15f on the second side of the rotor plane which is opposite to the first side of the rotor plane. If desired, the at least one permanent magnets 25 may have a spherical surface.

Electrically controlled magnets 24 may be attached to the outside of rotating outer circular wall 15a opposing permanent magnets 25. The spherical magnet surfaces of the permanent magnets 25 on the one or more magnet supports 15f on each rotor blade 10 and electrically controlled magnets 24 may have the same center point (e.g., as shown in FIG. 9) and may be arranged close enough to each other to allow inductive interaction between electrically controlled magnets 24 and permanent magnets 25, thereby implementing a pitch control apparatus, in which electrically controlled magnets 24 adjust the pitch angle of rotor blades 10 through inductive interaction with permanent magnets 25 on the rotor blades 10 (e.g., by pitching around a pitch axis such as pitch axis X of FIG. 7).

One or more brushes or any other well know technology able to transfer a current from a stationary wire to a moving part may transfer a current to electrically controlled magnets 24 on the outside of rotating outer circular wall 15a. If desired, different segments around the rotor axis may use different brushes that are electrically separated from each other to transfer a current to electrically controlled magnets 24. Thereby, electrically controlled magnets 24 may be controlled based on a current angular position of electrically controlled magnets 24, thereby allowing for cyclic pitch angle adjustments. Brushes are well known in the art. Thus, a detailed description of the brushes can be omitted for brevity and conciseness.

Figure 4A:
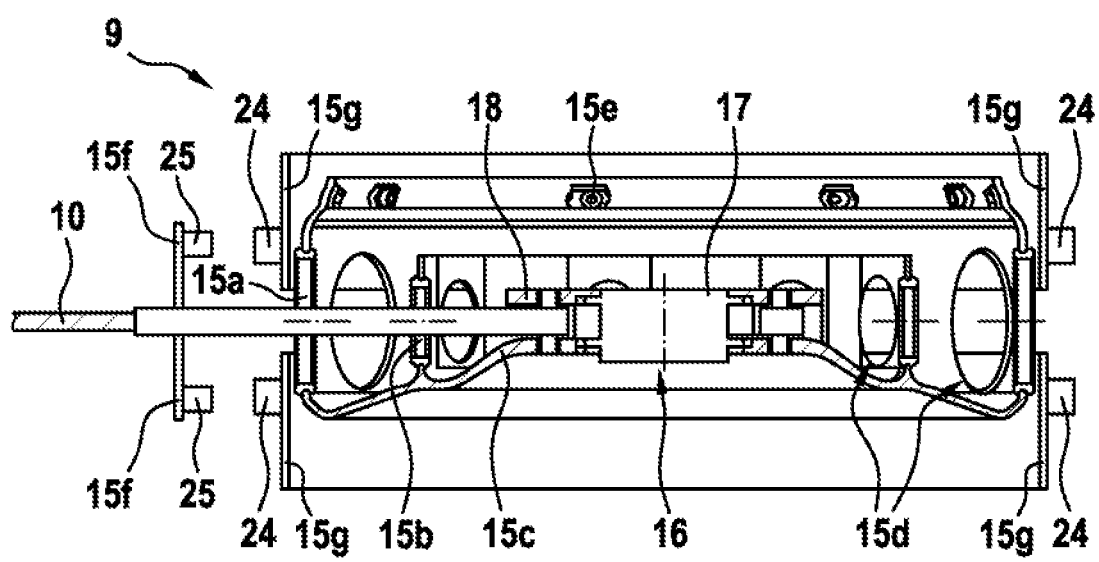
FIG. 4A is a diagram of an illustrative rotor hub with a pitch control apparatus having electrically controlled magnets installed on a non-rotating surface in accordance with some embodiments.

FIG. 4A shows an exemplary rotor hub (e.g., rotor hub 9 of FIG. 3) that includes non-rotating magnet support 15g, which is equipped with electrically controlled magnets 24, rotating outer wall 15a, inner wall 15b, bottom wall 15c, and central bade mount 16, which may include splined central component 17 and central flange 18. Rotor blades 10 are attached to central flange 18, which may enable pitch motion, but restrict flapping and lead/lag motion of rotor blades 10. Moreover, the reinforced central portion of bottom wall 15*c* to which central blade mount 16 is mounted, is illustrated.

According to some embodiments, electrically controlled magnets 24 may be arranged on non-rotating magnet support 15*g*. If desired, non-rotating magnet support 15*g* may be arranged on each side of the rotor blades 10 in planes that are perpendicular to the rotor axis (e.g., illustrated as rotor axis Y of FIG. 7) and above or below the pitch axis (e.g., illustrated as pitch axis X of FIG. 7). Non-rotating magnet support 15*a* may be attached to a non-rotatable part and extend around rotating outer circular wall 15*a*. As an example, non-rotating magnet support 15*g* may be attached to counter-torque stator 8*b* of rotorcraft 1 of FIG. 1 or to stator vanes 13 of FIG. 2. Non-rotating magnet support 15*g* may be equipped with electrically controlled magnets 24 that have a spherical magnet surface.

If desired, permanent magnets 25 may be arranged on magnet support 15*f* of rotor blade 10 opposite electrically controlled magnets 24. Permanent magnets 25 may have a spherical magnet surface. The spherical magnet surfaces of permanent magnets 25 and electrically controlled magnets 24 may have the same center point and may be arranged close enough to each other to allow inductive interaction between electrically controlled magnets 24 and permanent magnets 25. Thereby, electrically controlled magnets 24 may accelerate or decelerate the rotational movement of rotor blades 10 around the rotor axis and/or adjust the pitch angle of rotor blades 10 (e.g., by pitching around a pitch axis such as pitch axis X of FIG. 7).

Figure 4B:
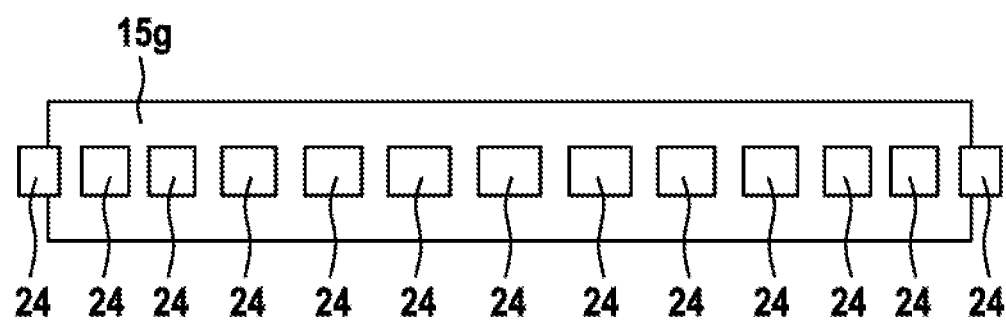
FIG. 4B is a diagram of an illustrative non-rotating magnet support with electrically controlled magnets in accordance with some embodiments.

FIG. 4B is a diagram of an illustrative non-rotating magnet support 15*g* with electrically controlled magnets 24 in accordance with some embodiments. Non-rotating magnet support 15*g* may have the shape of a ring. If desired, non-rotating magnet support 15*g* may be attached to a non-rotating part. As shown in FIG. 4B, the whole circumference of non-rotating magnet support 15*g* may be equipped with electrically controlled magnets 24.

FIG. 3A shows an illustrative pitch control apparatus 20 that is arranged opposing permanent magnets 25 having spherical magnet surface 19. Pitch control apparatus 20 may include electrically controlled magnets 24 having spherical magnet surface 15. If desired, spherical magnet surfaces 15 and 19 may have the same spherical center point. Electrically controlled magnets 24 may control and/or adjust the pitching of each rotor blade 10 individually.

Permanent magnets 25 and electrically controlled magnets 24 may form gap 21 between the spherical magnet surfaces 19 and 15 that is constant during pitching, if desired. Flapping and lead/lag motion of rotor blade 10 are movements, which are not concentric and therefore may change gap 21 despite the spherical magnet surfaces 19 and 15. Thus, gap 21 may be selected based on flapping and lead/lag motion of rotor blade 10.

According to one aspect, it may be desirable to control the distance between first and second spherical magnet surfaces 19, 15 illustrated by gap 21. For example, gap 21 may be selected to be small enough for the efficiency and operability of an electrical motor. The importance for controlling gap 21 between permanent magnet 25 and electrically controlled magnet 24 pairs may increase with increased first and second spherical magnet surfaces 19, 15. In scenarios in which the first and second spherical magnet surfaces 19, 15 have opposing spherical shapes and share the same spherical center point, gap 21 may be minimized regardless of the pitch motion, and gap 21 between permanent magnets 25 and electrically controlled magnets 24 may remain constant during pitching.

Figure 5C:
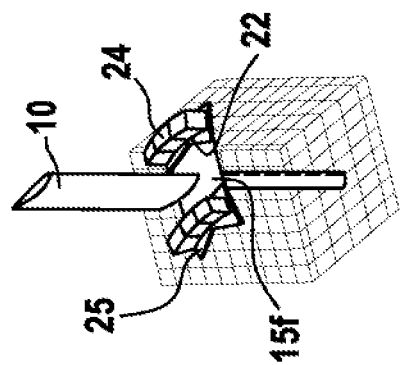
FIG. 5C is a diagram of an illustrative perspective view of a rotor blade with a pitch control apparatus that allows for a permanent magnet to be arranged on a magnet support around the rotor center on the rotor blade in accordance with some embodiments.
Figure 5D:
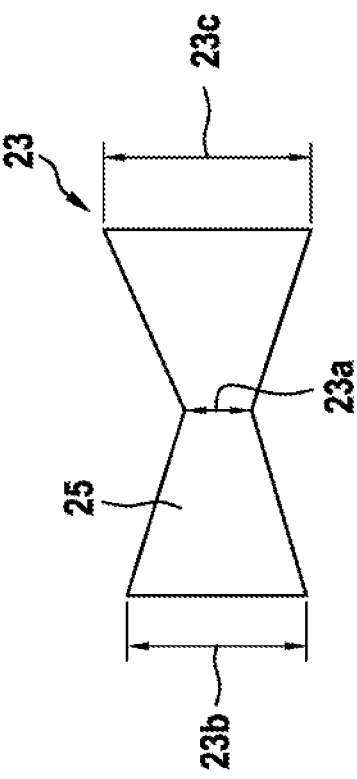
FIG. 5D is a diagram of an illustrative cross-section shape of a permanent magnet in accordance with some embodiments.
Figure 5A:
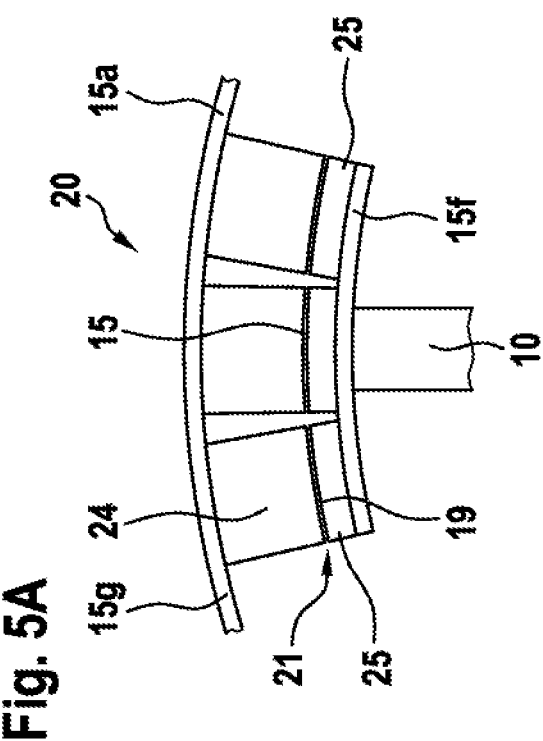
FIG. 5A is a diagram of an illustrative partial cut plan view of a pitch control apparatus in accordance with some embodiments.
Figure 5B:
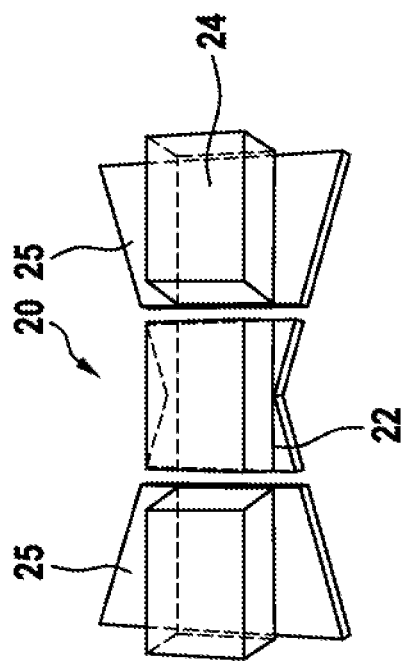
FIG. 5B is a diagram of an illustrative plan view of a pitch control apparatus that interacts with permanent magnets in a rotor in accordance with some embodiments.

FIG. 5B illustrates a plan view of pitch control apparatus 20 that interacts with permanent magnets 25. According to FIG. 5B, three permanent magnets 25 may overlap with three electrically controlled magnets 24 in overlap area 22. Overlap area 22 may be defined by an overlap shape between electrically controlled magnets 24 and permanent magnets 25. If desired, permanent magnets 25 and/or electrically controlled magnets 24 may be selected to have a respective shape such that overlap area 22 is constant during pitching of each rotor blade 10. For example, all electrically controlled magnets 24 may be selected to have a rectangular shape, while the permanent magnet at the central position has an hourglass cross-section shape such as hourglass cross-section shape 23 of FIG. 5D and the permanent magnets left and right of the central position have a trapezoidal cross-section such as trapezoidal cross-section shape 26 of FIG. 6D.

FIG. 5C illustrates permanent magnets 25 that are arranged opposing electrically controlled magnets 24 on rotor blade 10. As shown in FIG. 5C, permanent magnets 25 on each side of the rotor plane are installed on a magnet support 15*f* around the rotor center on each side of rotor blade 10. The shape of permanent magnets 25 may be defined by the shape of overlap area 22 between electrically controlled magnets 24 and permanent magnets 25.

According to one aspect, a part of overlap area 22 is defined as an hourglass shape that defines cross-section shape 23 of permanent magnet 25. FIG. 5D illustrates hourglass cross-section shape 23 of permanent magnet 25 having middle section width 23*a* and outer section widths 23*b*, 23*c* that are both greater than middle section width 23*a*. Middle section width 23*a* of hourglass cross-section shape 23 may be selected based on the width of electrically controlled magnets, such as electrically controlled magnets 24 of FIG. 5A or 5B. Outer section width 23*b*, 23*c* may be selected based on the maximum movement of permanent magnet 25 during pitching so that permanent magnet 25 overlaps with an opposing electrically controlled magnet 24.

If desired, hourglass cross-section shape 23 including middle section width 23*a* and/or outer section widths 23*b*, 23*c* may be selected based on the maximum pitch angle, the shape and/or size of electrically controlled magnets 24, the position of both magnets 24, 25 relative to pitch axis X or any deformations of the rotor blades other than the ones caused by the pitch angle adjustment, e.g., deformations caused by flapping or lead/lag moments.

In some embodiments, outer section widths 23*b* and 23*c* of hourglass cross-section shape 23 may have different sizes depending on overlap area 22 between permanent magnets 25 and electrically controlled magnets 24 during pitching.

In some embodiments, outer section widths 23*b* and 23*c* of hourglass cross-section shape 23 may have the same size depending on overlap area 22 between permanent magnets 25 and electrically controlled magnets 24 during pitching.

Figure 6A:
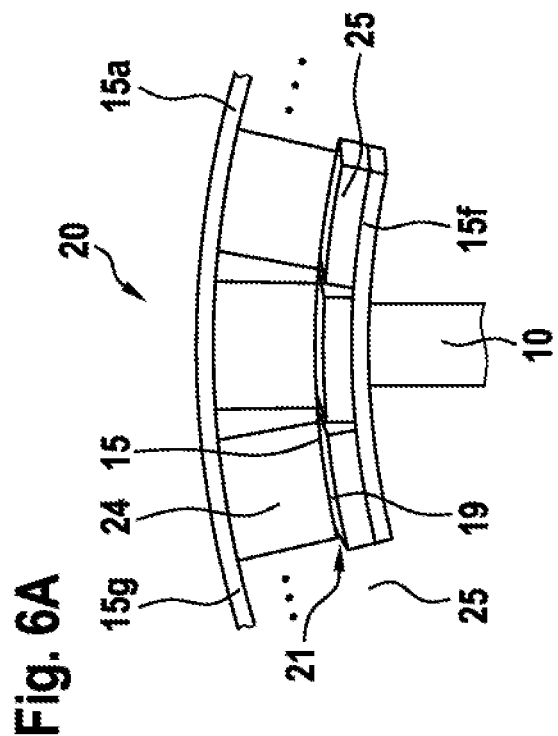
FIG. 6A is a diagram of an illustrative partial cut plan view of a pitch control apparatus during pitching in accordance with some embodiments.
Figure 6C:
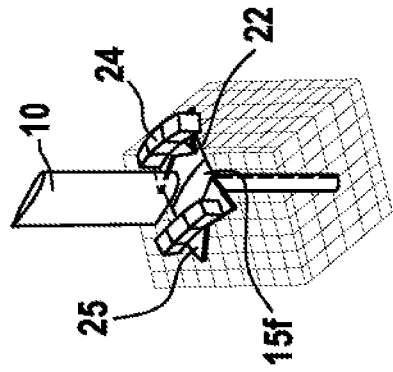
FIG. 6C is a diagram of an illustrative perspective view of a pitch control apparatus and a rotor blade during pitching in accordance with some embodiments.
Figure 6B:
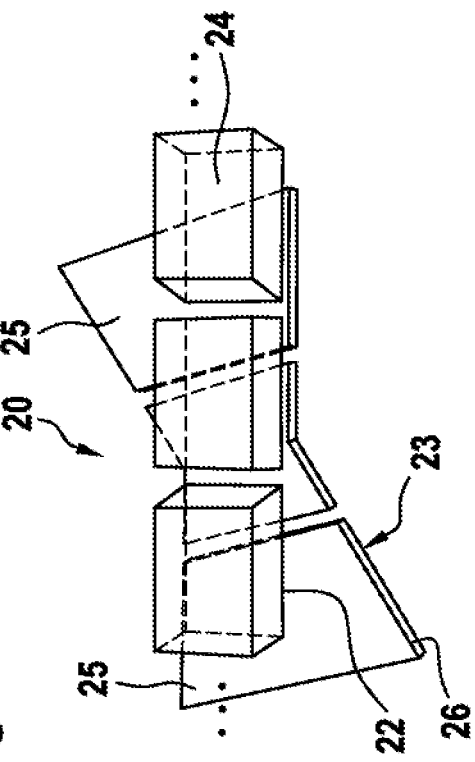
FIG. 6B is a diagram of an illustrative plan view of a pitch control apparatus during pitching in accordance with some embodiments.

FIGS. 6A, 6B, and 6C show an illustrative pitch control apparatus 20 during pitching.

FIG. 6A shows an illustrative pitch control apparatus 20 during pitching, whereby pitch control apparatus 20 is arranged opposing permanent magnets 25 with spherical magnet surface 19. Pitch control apparatus 20 may include electrically controlled magnets 24 having spherical magnet surface 15. If desired, spherical magnet surfaces 15 and 19 may have the same spherical center point. Electrically controlled magnets 24 may control and/or adjust the pitching of each rotor blade 10 individually. Permanent magnets 25 and electrically controlled magnets 24 may form gap 21 between the spherical magnet surfaces 19, 15 that is constant during pitching, if desired.

FIG. 6B illustrates a plan view of pitch control apparatus 20 that interacts with permanent magnets 25 during pitching. According to FIG. 6B, three permanent magnets 25 may overlap with three electrically controlled magnets 24 in overlap area 22. Overlap area 22 is defined by an overlap shape between electrically controlled magnets 24 and permanent magnets 25. If desired, the permanent magnets 25 and/or the electrically controlled magnets 24 may be selected to have a respective shape such that overlap area 22 is constant during pitching of each rotor blade 10. For example, all electrically controlled magnets 24 may be selected to have a polygonal shape such as a rectangular shape, a pentagonal shape, a hexagonal shape, etc. If desired, electrically controlled magnets 24 may have a round shape, an oval shape, an elliptical shape, etc. Permanent magnet 25 at the central position may have an hourglass shape, and the permanent magnets 25 left and right of the central position may have a trapezoidal shape. In some embodiments, all permanent magnets 25 may have a trapezoidal shape and the central position may be empty, if desired.

According to FIG. 6C, permanent magnets 25 may be installed on rotor blades 10 on a magnet support 15f around the rotor center on each side of the rotor plane. During pitching, the pitch motion leads to concentric paths of permanent magnets 25 around pitch axis X.

Figure 6D:
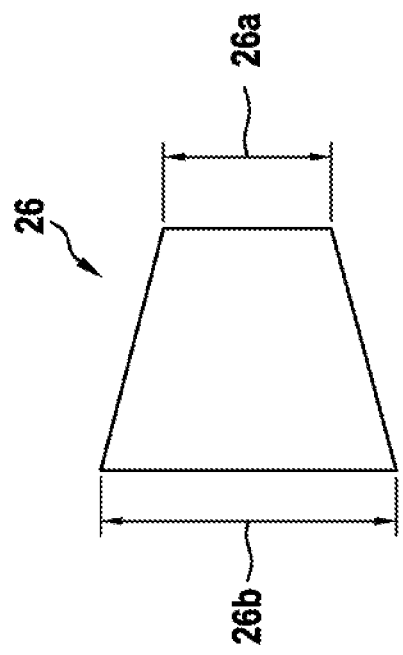
FIG. 6D is a diagram of an illustrative trapezoidal cross-section shape of a permanent magnet in accordance with some embodiments.

According to FIG. 6D, trapezoidal cross-section shape 26 of at least one permanent magnet 25 has outer section widths 26a and 26b, that may be defined by the maximum movement of rotor blades 10 and that may provide a constant overlap between electrically controlled magnets 24 and permanent magnets 25 in overlap area 22 during pitching.

If desired, trapezoidal cross-section shape 26 including outer section widths 26a, 26b may be selected based on the maximum pitch angle, the shape and/or size of electrically controlled magnets 24, the position of both magnets 24, 25 relative to pitch axis X or any deformations of the rotor blades other than the ones caused by the pitch angle adjustment, e.g., deformations caused by flapping or lead/lag moments.

FIGS. 7, 8A, 8B, and 9 illustrate an embodiment of rotor 8a with pitch control apparatus 20. Illustrated rotor blade 10 rotates around rotor axis Y and performs pitching around pitch axis X. Rotor axis Y and pitch axis X intersect in rotor center $P_0$.

Figure 7:
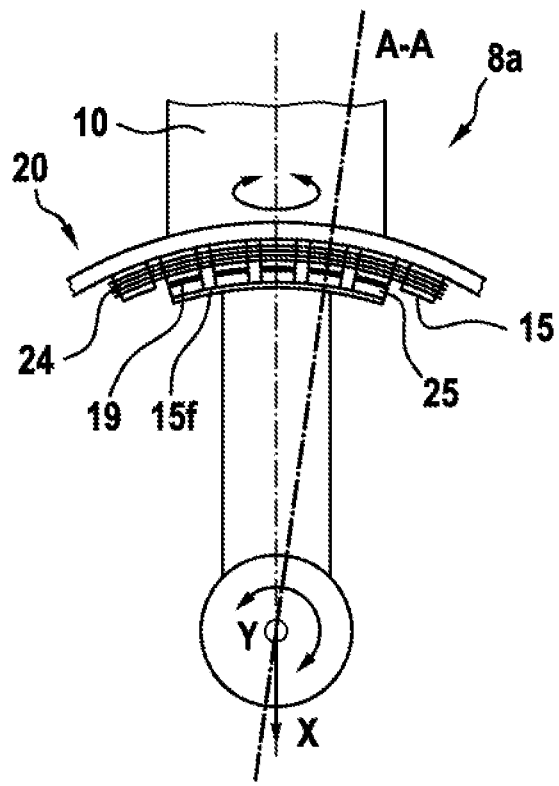
FIG. 7 is a diagram of an illustrative rotor with a pitch control apparatus that includes magnets with first and second spherical surfaces in accordance with some embodiments.

As shown in FIG. 7, rotor blade 20 has permanent magnets 25 that are arranged on magnet support 15f opposing electrically controlled magnets 24 of pitch control apparatus 20. Permanent magnets 25 and electrically controlled magnets 24 may form gap 21 between the spherical magnet surfaces 19, 15 that is constant during pitching, if desired.

Figure 8A:
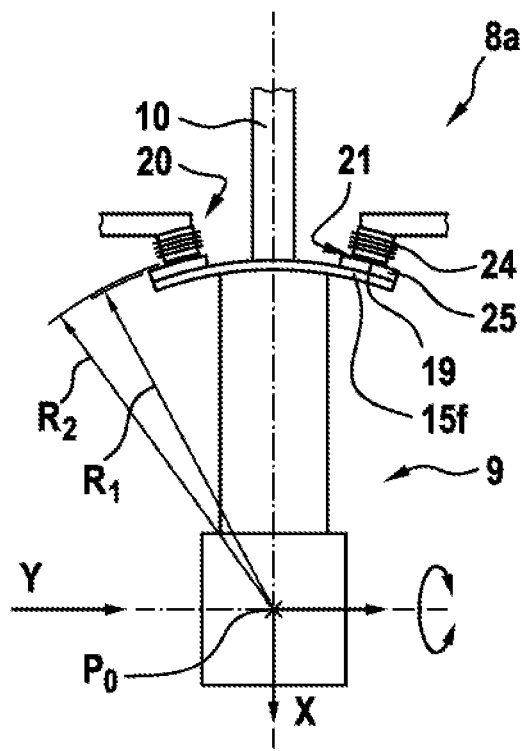
FIG. 8A is a diagram of an illustrative sectional view of a rotor with a pitch control apparatus in that electrically controlled magnets are arranged on the inner surface of the outer circular wall of a rotor hub in accordance with some embodiments.

FIG. 8A illustrates that permanent magnets 25 are arranged on rotor blade 10 such that spherical magnet surface 19 is at first predetermined radius $R_1$ from rotor center $P_0$ inside rotor hub 9, and that electrically controlled magnets 24 are arranged on a rotating magnet surface (e.g., rotating outer circular wall 15a of FIG. 3) or on a static, non-rotating magnet surface (e.g., non-rotating magnet surface 15g of FIG. 4A) such that spherical magnet surface 15 is at second predetermined radius $R_2$ from rotor center $P_0$.

According to some embodiment, second predetermined radius $R_2$ is greater than first predetermined radius $R_1$. Thus, electrically controlled magnets 24 may be arranged along an inner surface of a circular wall (e.g., rotating outer circular wall 15a of FIG. 3 or non-rotating magnet support 15g of FIG. 4). When electrically controlled magnets 24 are located on the inner surface of a circular wall (e.g., on the inner surface of the rotating outer circular wall 15a of FIG. 3 or on the inner surface of the non-rotating magnet support 15g of FIG. 4), electrically controlled magnets 24 may not pull away from the magnet support due to centrifugal forces during rotation of the rotor blades around the rotor axis Y.

According to some embodiments, spherical magnet surface 19 may be arranged on an outer surface of magnet support 15f of rotor blade 10. If desired, spherical magnet surface 19 may be located in rotor hub 9.

According to some embodiments, electrically controlled magnets 24 on a circular wall (e.g., rotating outer circular wall 15a of FIG. 3 or non-rotating magnet support 15g of FIG. 4) are installed around the rotor center on at least a part of the inside of the outer circular wall.

Figure 8B:
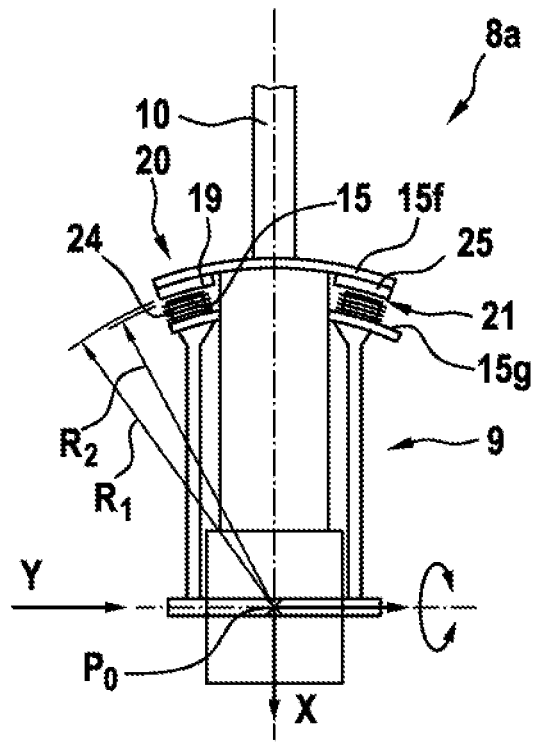
FIG. 8B is a diagram of an illustrative rotor with a pitch control apparatus in that electrically controlled magnets are arranged on the outer surface of the outer circular wall of a rotor hub in accordance with some embodiments.

FIG. 8B illustrates that permanent magnets 25 are arranged on rotor blade 10 such that spherical magnet surface 19 is at first predetermined radius $R_1$ from rotor center $P_0$, and that electrically controlled magnets 24 are arranged on an outer surface of a circular wall (e.g., rotating outer circular wall 15a of FIG. 3 or non-rotating magnet support 15g of FIG. 4) such that spherical magnet surface 15 is at second predetermined radius $R_2$ from rotor center $P_0$.

According to FIG. 8B, an embodiment of rotor 8a with pitch control apparatus 20 is illustrated in which first predetermined radius $R_1$ is greater than second predetermined radius R2. In other words, spherical magnet surface 15 may be arranged closer to rotor center P0 than spherical magnet surface 19.

According to some embodiments, electrically controlled magnets 24 may be arranged along an outer surface of a circular wall (e.g., rotating outer circular wall 15a of FIG. 3 or non-rotating magnet support 15g of FIG. 4). If desired, permanent magnets 25 may be located on magnet support 15f of rotor blade 10 outside of rotor hub 9.

FIG. 9 illustrates the relationship between first distance $D_1$ from rotor axis Y and second distance $D_2$ from pitch axis X that define first predetermined radius $R_1$, as well as the relationship between third distance $D_3$ from rotor axis Y and fourth distance $D_4$ from pitch axis X that define second predetermined radius $R_2$. Preferably, the second and fourth distances $D_2$, $D_4$ are selected based on a predetermined pitch torque requirement for each rotor blade 10 of the at least two rotor blades 10 during pitching. The first and third distances $D_1$, $D_3$ are preferably selected based on a predetermined drive torque requirement for driving the rotor 8a.

According to some embodiments, spherical magnet surface 19 of permanent magnets 25 is arranged at first predetermined radius $R_1$ from rotor center $P_0$, and spherical magnet surface 15 of electrically controlled magnets 24 is arranged at second predetermined radius $R_2$ from rotor center $P_0$ in rotor hub 9.

According to some embodiments, second predetermined radius $R_2$ is greater than first predetermined radius $R_1$. As an example, electrically controlled magnets 24 may be arranged along an inner surface of a circular wall (e.g., rotating outer circular wall 15a of FIG. 3 or non-rotating magnet support 15g of FIG. 4).

According to some embodiments, electrically controlled magnets 24 on a circular wall (e.g., rotating outer circular wall 15a of FIG. 3 or non-rotating magnet support 15g of FIG. 4) are installed around the rotor center on at least a part of the circular wall.

According to some embodiments, the number, size, and/or strength of electrically controlled magnets 24 and the number, size, and/or strength of permanent magnets 25 for each blade 10 may be selected based on the absolute values of radii $R_1$ and $R_2$, the difference between radii $R_1$ and $R_2$, the length of the rotor blades, the maximum pitch angle, the required pitch frequency, the required circumferential pitch control resolution, the required torque to perform pitching of the rotor blades, etc.

According to some embodiments, rotorcraft 1 of FIG. 1 may include rotor 8a with pitch control apparatus 20. If desired, pitch control apparatus 20 may be used for controlling the blade pitch in any thrust generating rotational system (e.g., ship propellers, helicopter rotors, etc.) or passively rotating system (e.g., fluid-driven turbines, rotors, or propellers such as wind turbines or water-submerged turbines that generate power from the movement of surrounding fluids, etc.).

It should be noted that the above-described embodiments are merely described for illustration purposes, but not in order to restrict the invention as claimed. Instead, multiple modifications and variations of the presented embodiments are possible and should, therefore, also be considered as being part of the claimed invention.

For example, pitch control apparatus 20 of FIGS. 5A and 5B is shown with three permanent magnets 25 and three electrically controlled magnets 24. However, pitch control apparatus 20 of FIGS. 5A and 5B may have any number of permanent magnets 25 and/or any number of electrically controlled magnets. The number of permanent magnets 25 may be selected to be the same as, greater than, or smaller than the number of electrically controlled magnets 24, if desired. For example, pitch control apparatus 20 of FIGS. 5A and 5B may have one permanent magnet and one electrically controlled magnet, two permanent magnets and one electrical magnet, one permanent magnet and two electrically controlled magnets, etc. Furthermore, the size of the permanent magnets may be bigger or smaller than the size of the electrically controlled magnets in any dimension including in circumferential direction.

As another example, in FIG. 5B, all permanent magnets may be selected to have a rectangular shape, while the electrically controlled magnet 24 in the central position has an hourglass shape and the electrically controlled magnets 24 left and right of the central position have a trapezoidal shape.

As yet another example, electrically controlled magnets 24 may have any polygonal shape such as a rectangular shape, a pentagonal shape, a hexagonal shape, etc. or any rounded shape such as a round shape, an oval shape, an elliptical shape, etc., and the number, size, and shape of permanent magnets 25 may be selected based on the shape of the electrically controlled magnets 24.

Moreover, in FIGS. 6A and 6B, the dimensions of permanent magnets 25 and/or the dimensions of electrically controlled magnets 24 may be selected such that permanent magnets 25 completely overlap electrically controlled magnets 24 with a maximum lead/lag and/or flapping movement of the rotor blades. Alternatively, the dimensions and/or shapes of permanent magnets 25 and/or the dimensions and/or shapes of electrically controlled magnets 24 may be selected such that electrically controlled magnets 24 completely overlap permanent magnets 25 with a maximum lead/lag and/or flapping movement of the rotor blades.

If desired, some or all permanent magnets 25 in FIG. 3, 4, 5A, 5B, 5C, 6A, 6B, 6C, 7, 8A, 8B, or 9 may be replaced by electrically controlled magnets 24. Moreover, FIG. 3 illustratively shows rotor hub 9, that is adapted for supporting at least two rotor blades 10. However, a rotor with a single rotor blade and an opposing counteracting balance weight is also possible.

Furthermore, the described and illustrated configurations of rotor 8a can be varied arbitrarily without influencing an underlying functionality thereof. In consequence, corresponding configurations of the rotor can be adapted as required, and so on.

REFERENCE LIST 1 rotorcraft
1a main rotor
1b fuselage aft section
2 fuselage
2a tail boom
3 shroud
4 bumper
5 fin
5a tail wing
5b rudder
6 transverse duct
7 duct-type tail portion
8 counter-torque device
8a rotor
8b stator
9 rotor hub
9a hub cover
10 rotor blades
11 drive shaft fairing
12 gearbox fairing
13 stator vanes
14 tail rotor drive shaft
15 second spherical magnet surface
15a rotating outer circular wall
15b inner circular wall
15c bottom wall
15d round apertures
15e hub cover attachments
15f magnet support on rotor blade
15g non-rotating magnet support
16 central blade mount
17 splined central component
18 central flange
19 first spherical magnet surface
20 pitch control apparatus
21 gap
22 overlap area
23 hourglass cross-section shape
23a middle section width
23b, 23c outer section width
24 electrically controlled magnets
25 permanent magnet
26 trapezoidal cross-section shape
26a, 26b outer section width
$P_0$ rotor center
$D_1$ first distance
$D_2$ second distance
$D_3$ third distance
$D_4$ fourth distance
$R_1$ first predetermined radius
$R_2$ second predetermined radius
X pitch axis
Y rotor axis

What is claimed is:

1. A rotor, comprising:
at least two rotor blades, wherein each rotor blade of the at least two rotor blades rotates around a rotor axis and performs pitching around a pitch axis, wherein the rotor axis and the pitch axis intersect in a rotor center,
wherein each rotor blade comprises: at least one permanent magnet arranged such that a first spherical magnet surface has a first predetermined radius from the rotor center; and
a pitch control apparatus for controlling the pitching of the at least two rotor blades that comprises electrically controlled magnets arranged such that a second spherical magnet surface has a second predetermined radius from the rotor center.

2. The rotor of claim 1,
wherein a first distance from the rotor axis and a second distance from the pitch axis define the first predetermined radius, a third distance from the rotor axis and a fourth distance from the pitch axis define the second predetermined radius, and wherein the first spherical magnet surface is at the first predetermined radius from the rotor center, and the second spherical magnet surface is at the second predetermined radius from the rotor center.

3. The rotor of claim 2,
wherein the second and fourth distances, are selected based on a predetermined pitch torque requirement for each rotor blade of the at least two rotor blades during pitching.

4. The rotor of claim 2,
wherein the first and third distances, are selected based on a predetermined drive torque requirement for driving the rotor.

5. The rotor of claim 2,
wherein the first predetermined radius is greater than the second predetermined radius.

6. The rotor of claim 2,
wherein the second predetermined radius is greater than the first predetermined radius.

7. The rotor of claim 2,
wherein the at least one permanent magnet and the electrically controlled magnets are arranged opposing each other and form a constant gap between the first and second spherical magnet surfaces, during pitching defined by an absolute value of a difference between the first and second predetermined radii.

8. The rotor of claim 7,
wherein the constant gap between the first and second spherical magnet surfaces ensures an overlapping magnetic field between the at least one permanent magnet and the electrically controlled magnets.

9. The rotor of claim 1,
wherein the electrically controlled magnets control the pitching of each rotor blade of the at least two rotor blades individually.

10. The rotor of claim 1,
wherein the at least two rotor blades rotate in a rotor plane and wherein each rotor blade of the at least two rotor blades comprises at least one first permanent magnet of the at least one permanent magnet on a first side of the rotor plane and at least one second permanent magnet of the at least one permanent magnet on a second side of the rotor plane that is opposite to the first side of the rotor plane.

11. The rotor of claim 10,
wherein the at least one first permanent magnet and the at least one second permanent magnet are installed on a magnet support around the rotor center on each side of the at least two rotor blades and move with the at least two rotor blades around the pitch axis during pitching.

12. The rotor of claim 1,
wherein the at least one permanent magnet of each rotor blade overlaps with at least a portion of the electrically controlled magnets in an overlap area, and wherein the overlap area is constant during pitching of each rotor blade of the at least two rotor blades.

13. The rotor of claim 12,
wherein the at least one permanent magnet has an hourglass cross-section shape, wherein the hourglass cross-section shape of the at least one permanent magnet has a middle section width and an outer section width that is greater than the middle section width, and wherein the middle section width is based on the width of the electrically controlled magnets, and the outer section width is based on a maximum movement of the at least one permanent magnet during pitching.

14. The rotor of claim 12,
wherein the at least one permanent magnet has a trapezoidal cross-section shape wherein the trapezoidal cross-section shape of the at least one permanent magnet has a first outer section width and a second outer section width that is greater than the first outer section width.

15. The rotor of claim 1,
further comprising a rotor hub having an outer circular wall and a central blade mount that receives the at least two rotor blades, wherein the electrically controlled magnets are arranged on the outer circular wall.

16. The rotor of claim 15,
wherein the outer circular wall provides a static, non-rotating magnet support.

17. A rotorcraft with at least one rotor according to claim 1.

* * * * *